US010891086B2

(12) United States Patent
Coulter et al.

(10) Patent No.: US 10,891,086 B2
(45) Date of Patent: Jan. 12, 2021

(54) JOB TICKET CONFLICT RESOLUTION FOR PRINT JOBS

(71) Applicants: Justin J. Coulter, Longmont, CO (US); David Ward, Broomfield, CO (US)

(72) Inventors: Justin J. Coulter, Longmont, CO (US); David Ward, Broomfield, CO (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/291,330

(22) Filed: Mar. 4, 2019

(65) Prior Publication Data
US 2020/0285428 A1    Sep. 10, 2020

(51) Int. Cl.
*G06F 3/12* (2006.01)

(52) U.S. Cl.
CPC .......... *G06F 3/1205* (2013.01); *G06F 3/1248* (2013.01); *G06F 3/1254* (2013.01); *G06F 3/1256* (2013.01); *G06F 3/1279* (2013.01)

(58) Field of Classification Search
CPC .... G06F 3/1205; G06F 3/1248; G06F 3/1254; G06F 3/1256; G06F 3/1279
USPC ............... 358/1.14, 1.9, 1.15, 3.27, 538
See application file for complete search history.

(56) References Cited

U.S. PATENT DOCUMENTS

| 7,242,487 B2 | 7/2007 | Lucivero et al. |
|---|---|---|
| 7,394,558 B2 | 7/2008 | Stringham |
| 8,320,008 B2 | 11/2012 | Jahn |
| 8,755,060 B2 | 6/2014 | Torii |
| 9,207,887 B1 | 12/2015 | Lahey et al. |
| 9,383,952 B1 | 7/2016 | Kramer |
| 9,727,287 B2 | 8/2017 | Amir et al. |
| 9,778,886 B2 | 10/2017 | Boldt et al. |
| 10,152,284 B2 | 12/2018 | Sikkink et al. |
| 2004/0141207 A1* | 7/2004 | Warmus ............. B42C 19/00 358/1.18 |
| 2007/0070374 A1 | 3/2007 | Boyes et al. |
| 2009/0021757 A1 | 1/2009 | Liu et al. |
| 2016/0202938 A1* | 7/2016 | Bandyopadhyay ... G06F 3/1205 358/1.15 |
| 2017/0131956 A1 | 5/2017 | Kuroiwa |

(Continued)

FOREIGN PATENT DOCUMENTS

| ES | 2664080 | 4/2018 |
|---|---|---|
| GB | 2354622 A | 3/2001 |
| JP | 4933919 B2 | 5/2012 |

OTHER PUBLICATIONS

Hirano et al; Text and Layout Information Extraction from Document Files ofVarious Formats Based on the Analysis of Page Description Language; Ninth International Conference on Document Analysis and Recognition (ICDAR 2007).

(Continued)

*Primary Examiner* — Quang N Vo
(74) *Attorney, Agent, or Firm* — Duft & Bornsen, PC

(57) ABSTRACT

Embodiments described herein manage conflicts between media descriptions in a print job, and media descriptions in a job ticket associated with the print job. One embodiment comprises a print controller. The print controller identifies a logical page having an unmodifiable media attribute, directs a Raster Image Processor (RIP) of the print controller to rasterize the logical page based on the unmodifiable media attribute, and modifies the raster data generated by the RIP for the logical page based on a media attribute specified in a job ticket for the logical page.

23 Claims, 12 Drawing Sheets

(56) References Cited

U.S. PATENT DOCUMENTS

2018/0136889 A1    5/2018  Ward et al.
2019/0129660 A1*   5/2019  Liebelt .................. G06F 3/1212

OTHER PUBLICATIONS

European Search Report; Application EP20140408; dated Jul. 31, 2020.

* cited by examiner

JOB TICKET CONFLICT RESOLUTION FOR PRINT JOBS

FIELD

This disclosure relates to the field of printing systems, and in particular, to print controllers that interpret and rasterize incoming print jobs.

BACKGROUND

In the field of printing, some print jobs are submitted along with a job ticket, which provides instructions for printing a print job. For example, the job ticket may include instructions that specify a media and a media feed orientation for pages of the print job. Print jobs may also include instructions that specify a media and a media feed orientation for pages of the print job.

In some cases, a conflict may occur between the instructions in the job ticket and the instructions in the print job. Typically, the instructions in the job ticket are used to override the instructions in the print job. However, the Page Description Language (PDL) of the print job may prevent modifications to the presentation of the print job dictated by the job ticket, with the result being that the print job is printed incorrectly (e.g., not as desired). Therefore, there is a desire to correct these issues.

SUMMARY

Embodiments described herein manage conflicts between media descriptions in a print job, and media descriptions in a job ticket associated with the print job. For example, logical pages in a print job may have one or more media attributes that are not effectively allowed to be modified according to the language (e.g., the PDL) of the logical page. When the job ticket specifies a media attribute that conflicts with the media attribute in the logical page, the logical page may be rasterized using the media attribute specified by the logical page. The rasterized version of the logical page may then be modified according to the media attribute specified in the job ticket to resolve the conflict and achieve the desired results.

One embodiment comprises a system that includes a print controller. The print controller includes a RIP and a controller. The controller identifies a logical page having an unmodifiable media attribute, directs the RIP to rasterize the logical page based on the unmodifiable media attribute, and modifies the raster data generated by the RIP for the logical page based on a media attribute specified in a job ticket for the logical page.

Another embodiment comprises a method of modifying raster data for logical pages that have unmodifiable media attributes. The method comprises identifying a logical page of a print job that has an unmodifiable media attribute, rasterizing the logical page based on the unmodifiable media attribute, and modifying raster data generated for the logical page based on a media attribute specified in a job ticket for the logical page.

Another embodiment comprises a non-transitory computer readable medium embodying programmed instructions which, when executed by at least one processor, direct the at least one processor to identify a logical page of a print job that has an unmodifiable media attribute, rasterize the logical page based on the unmodifiable media attribute, and modify raster data generated for the logical page based on a media attribute specified in a job ticket for the logical page.

The above summary provides a basic understanding of some aspects of the specification. This summary is not an extensive overview of the specification. It is intended to neither identify key or critical elements of the specification nor delineate any scope of the embodiments of the specification, or delineate any scope of the claims. Its sole purpose is to present some concepts of the specification in a simplified form as a prelude to the more detailed description that is presented later.

DESCRIPTION OF THE DRAWINGS

Some embodiments are now described, by way of example only, and with reference to the accompanying drawings. The same reference number represents the same element or the same type of element on all drawings.

DESCRIPTION

The figures and the following description illustrate specific exemplary embodiments. It will be appreciated that those skilled in the art will be able to devise various arrangements that, although not explicitly described or shown herein, embody the principles described herein and are included within the contemplated scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Some PDLs (e.g., POSTSCRIPT®) are interpretive programming languages with powerful capabilities. There exists a subset of interpreted PDL print files that are generated with unmodifiable media attributes, such as POSTSCRIPT® procedures that include both layout instructions (e.g., portrait layout at zero-degree rotation) at either the page level or at the job level, as well as internal POSTSCRIPT® procedures that are designed to overwrite any Current Transformation Matrix (CTM) modifications using the POSTSCRIPT® CTM specified by the job (i.e., a job-specified CTM).

A Digital Front End (DFE) or the like receives job control instructions in the form of a job ticket for the purpose of changing or setting a page or job attribute (e.g., layout rotation, media, etc.). However, applying the job ticket instructions to an interpreted PDL data stream may not be possible when procedures defined in the interpreted PDL enforce the job attribute values (e.g., media, rotation, etc.). For example, a DFE's POSTSCRIPT® processing design may rely upon setting the POSTSCRIPT® interpreter's CTM (scale, rotate, and translate) to accommodate final job ticket-specified media, layout and imposition exceptions (or overrides). Executing this class of POSTSCRIPT® print files sent to a DFE that also allows for job tickets to override page or job attributes may produce incorrect printed output if the CTM modifications used to implement the job ticket instructions are overwritten by the POSTSCRIPT® processor during interpretation with the job-specified CTM of the print job.

Embodiments described herein manage conflicts between media descriptions in a print job, and media descriptions in a job ticket associated with the print job. In particular, the embodiments described herein manage conflicts between unmodifiable media attributes for logical pages that conflict with the media attributes specified in a job ticket for the logical pages. An unmodifiable media attribute is an attribute (that maps coordinates specified by the PDL into output device coordinates to achieve any combination of scaling, rotation and/or translation of the print images) that remains, from the value specified in a supplemental instruction for that attribute, after RIP processing.

Figure 1:
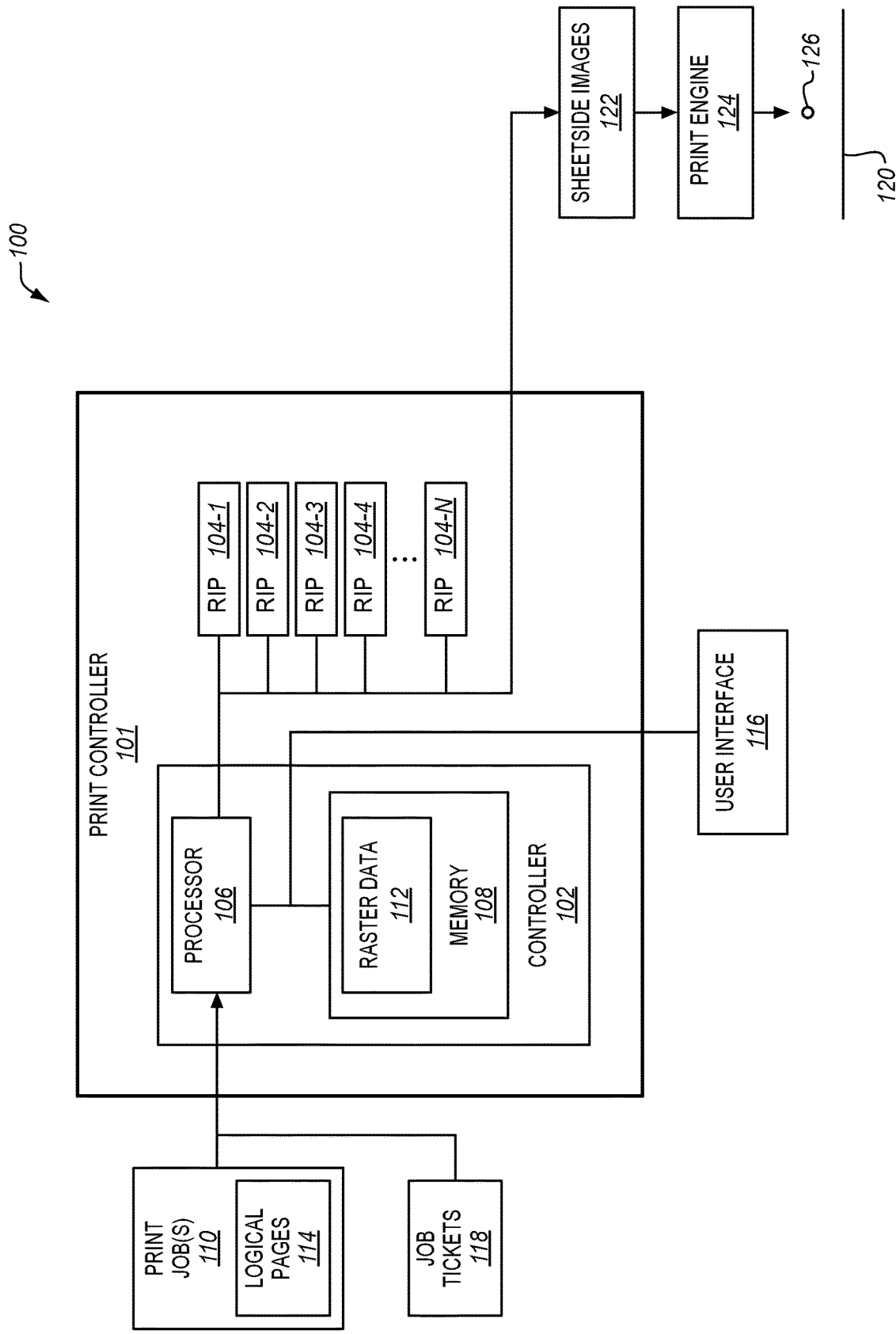
FIG. 1 is a block diagram of a print controller and a print engine in an illustrative embodiment.

FIG. 1 is block diagram of a system 100 in an illustrative embodiment. In this embodiment, system 100 includes a print controller 101. In some embodiments, system 100 may further include a user interface 116 and/or a print engine 124. In some embodiments, print controller 101 may be referred to as a DFE. Print controller 101 may operate outside of a printing system as a separate element in some embodiments, or may be included within a printing system in other embodiments. Further, print controller 101 may be included within print engine 124 in some embodiments.

In this embodiment, print controller 101 includes a controller 102 and one or more RIPs 104. Controller 102 includes a processor 106 and a memory 108. RIPs 104 may be implemented in hardware, firmware, or a combination of hardware and firmware. RIPs 104 comprise any component, system, or device that interprets and rasterizes print jobs(s) 110 to generate raster data 112, which may be stored at memory 108 of controller 102 or at a RIP spool (not shown). As described herein, raster data 112 may be subject to further processing. For example, raster data 112 may comprise rasterized logical pages 114 of print job 110, which may be modified by processor 106 of controller 102 based on information described in job tickets 118 of print jobs 110. During the printing process, raster data 112 may be assembled into sheetside images 122, which are transmitted by print controller 101 to destination (e.g., print engine 124). Print engine 124 may receive sheetside images and generate a printed output of sheetside images 122.

While the specific hardware implementation of print controller 101 is subject to design choices, print controller 101 may comprise any electronic circuits and/or optical circuits that are able to perform the functions described herein for print controller 101. Print controller 101 may include one or more processors (e.g., processor 106 of controller 102), Central Processing Units (CPU), Graphics Processing Units (GPU), microprocessors, Digital Signal Processors (DSPs), Application-specific Integrated Circuits (ASICs), Programmable Logic Devices (PLD), control circuitry, etc. Some examples of processors include INTEL® CORE™ processors, Advanced Reduced Instruction Set Computing (RISC) Machines (ARM®) processors, etc.

Print controller 101 may further comprise any electronic circuits, and/or optical circuits, and/or magnetic circuits that are able to store data. For instance, print controller 101 may include one or more memories (e.g., memory 108 of controller 102), volatile or non-volatile Dynamic Random-Access Memory (DRAM) devices, FLASH devices, volatile or non-volatile Static RAM devices, magnetic disk drives, Solid State Disks (SSDs), etc. Some examples of non-volatile DRAM and SRAM include battery-backed DRAM and battery-backed SRAM.

Print engine 124 comprises any system, component, or device that marks a medium 120 with one or more colorants 126. Colorant 126 may comprise toner, liquid inks, wax, or any material suitable to mark medium 120. Medium 120 may be continuous form or cut sheet, as desired. Medium 120 may comprise paper, textile, plastic, or any tangible substrate for marking with colorant 126. Print engine 124 may comprise one or more marking engines as a matter of design. For example, print engine 124 may comprise at least one marking engine disposed on each side of medium 120.

User interface 116 comprises any system, component, or device that allows a user to interact with print controller 101. For example, user interface 116 may comprise a visual display, a keyboard, a mouse, or combinations thereof.

Figure 2:
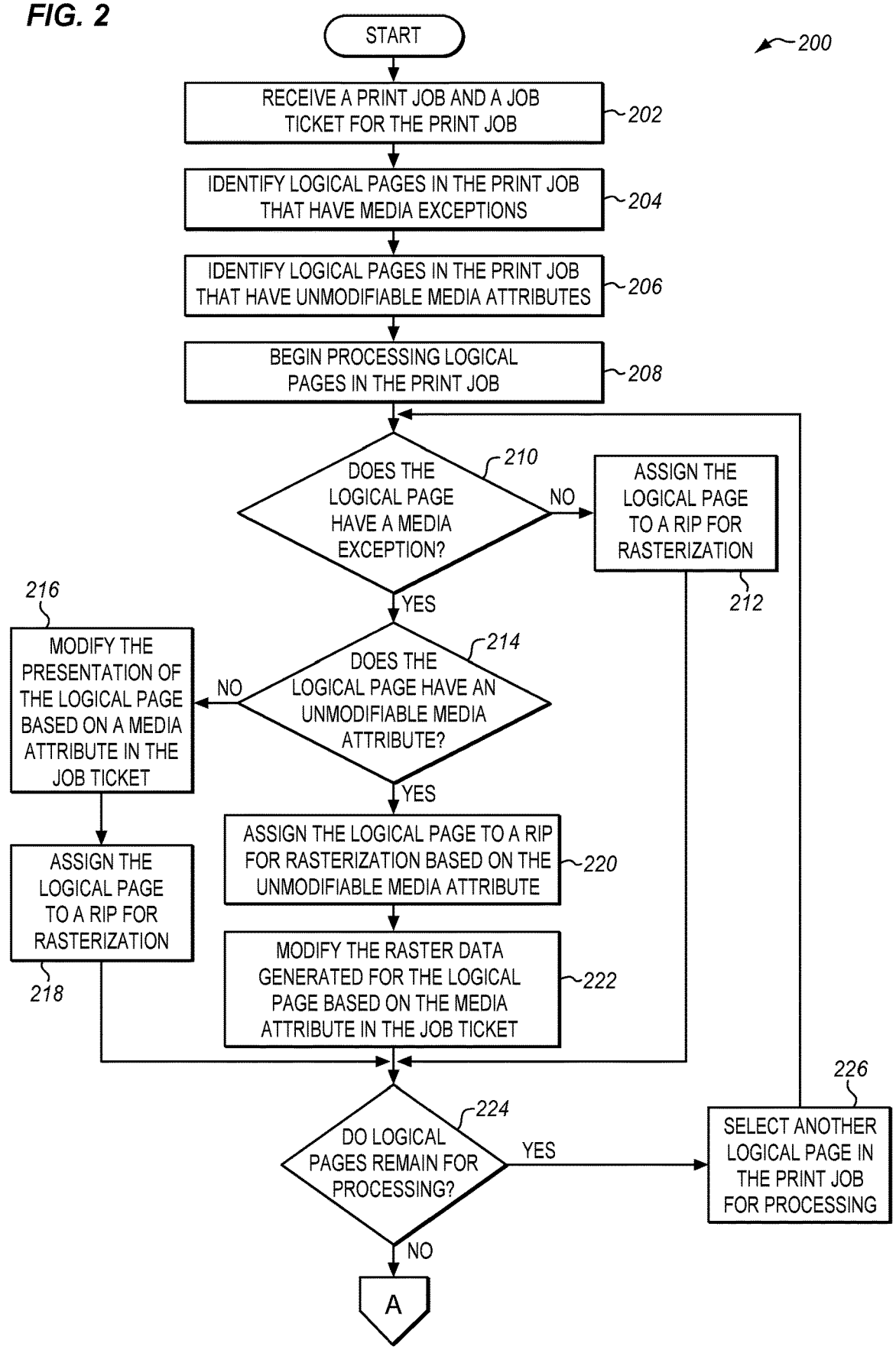
FIGS. 2-3 are flow charts of a method of modifying raster data for logical pages that have unmodifiable media attributes in an illustrative embodiment.

Consider that print controller 101 is operational and ready to begin processing print job(s) 110. FIG. 2 is a flow chart of a method 200 of modifying raster data for logical pages that have unmodifiable media attributes an illustrative embodiment. Method 200 will be discussed with respect to print controller 101 of FIG. 1, although method 200 may be performed by other systems, not shown. The steps of the flow charts described herein may include other steps that are not shown. Also, the steps of the flow charts described herein may be performed in an alternate order.

Processor 106 of controller 102 receives print job 110 (see FIG. 2, step 202). Print job 110 may utilize a PDL to describe print data in print job 110. Some examples of a PDL include the Portable Document Format (PDF), an Intelligent Printer Data Stream (IPDS), POSTSCRIPT®, etc. A job ticket 118 may be included as part of print job 110 in some embodiments. In other embodiments, one or more job tickets 118 may be separate from print job 110 and received separately from print job 110. Job tickets 118 provide a mechanism for specifying instructions for processing print jobs 110.

Processor 106 identifies logical pages 114 in print job 110 that have media exceptions (see FIG. 2, step 204). To identify media exceptions, processor 106 may compare the media attributes specified in job ticket 118 for logical pages 114 with the media attributes specified in print job 110 or in logical pages 114, and determine whether there is a conflict. Conflicts occur when the instructions in job ticket 118 and the instructions in print job 110 (or instructions for a page) are different. For instance, job ticket 118 may specify A4 long-edge fed media for a page in print job 110, while print job 110 (or the page itself) may specify A4 short-edge fed media.

Processor 106 identifies logical pages 114 in print job 110 that have unmodifiable media attributes (see FIG. 2, step 206). An unmodifiable media attribute specified for a page may prevent a modification of the presentation of the page prior to rasterization. The page (or print job 110) may, for instance, include PDL features which prevents modification of the presentation of the page.

For example, if the PDL of print job 110 is POSTSCRIPT®, then processor 106, to determine if a page has an unmodifiable media attribute, may generate a custom CTM for RIP 104-1 based on the media attribute specified in job ticket 118 for the page, and determine whether RIP 104-1 overwrites the custom CTM during an interpretation of the page with the job-specified CTM. If the custom CTM is overwritten during interpretation of a page, then it may be determined that the page has an unmodifiable media attribute. In another example, processor 106 may analyze the PDL of the page to determine if the page has an unmodifiable media attribute. For instance, processor 106 may analyze the PDL of the page directly without interpreting the PDL of the page.

Processor 106 begins processing logical pages 114 in print job 110 (see FIG. 2, step 208). Processor 106 determines whether a page being processed has a media exception (see FIG. 2, step 210). For instance, processor 106 may have generated job exception metadata in step 204 (e.g., during a pre-flight process of print job 110), which identifies which of logical pages 114 in print job 110 have media exceptions. If the page being processed does not have a media exception, then processor 106 assigns the page to one of RIPs 104 for rasterization (see FIG. 2, step 212). A RIP 104 rasterizing the page being processed generates raster data 112 for the page.

If processor 106 determines that the page being processed does have a media exception (e.g., using information from the job exception metadata generated in step 204), then step 214 is performed by processor 106 to determine if the page being processed has an unmodifiable media attribute. For instance, processor 106 may have generated metadata in step 206 (e.g., during a pre-flight process for print job 110) that identifies which of logical pages 114 in print job 110 have unmodifiable media attributes.

If the page being processed does not have an unmodifiable media attribute, then processor 106 modifies the presentation of the page based on the media attribute specified in job ticket 118 for the page (see FIG. 2, step 216). For example, if the PDL of print job 110 is POSTSCRIPT®, then processor 106 may apply a custom CTM to RIP 104-1 that modifies the presentation of the page, and assign the page to RIP 104-1 for rasterization (see FIG. 2, step 218). RIP 104-1 rasterizes the page using the custom CTM, and generates raster data 112 for the page.

In another example, if the PDL of print job 110 is PDF, then processor 106 may modify the PDL of the page based on the media attribute specified in job ticket 118 for the page. In continuing with the PDF example, processor 106 may assign the modified page to RIP 104-1, which rasterizes the modified logical page 114 to generate raster data 112.

Figure 9:
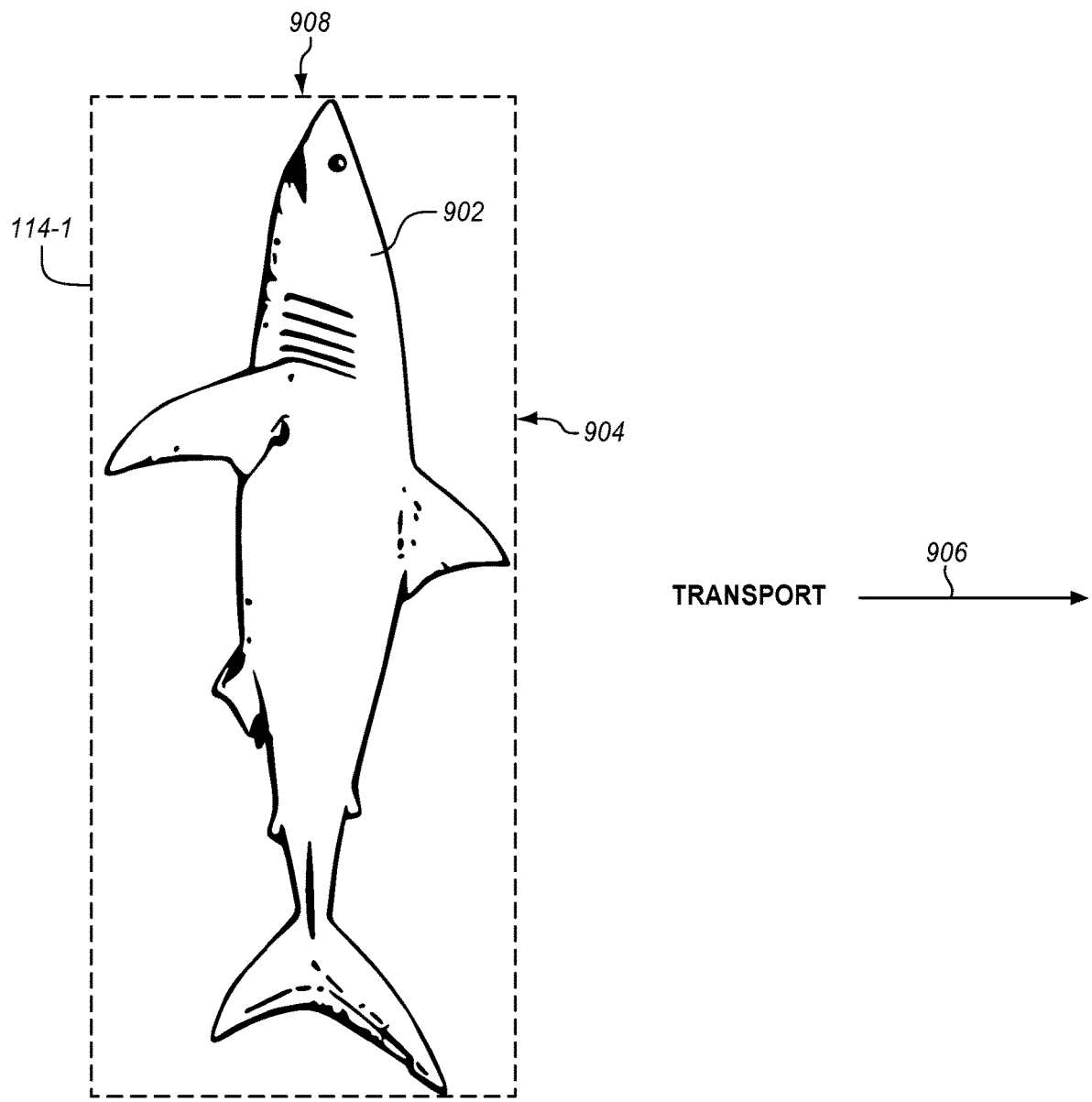
FIG. 9 illustrates a logical page having an unmodifiable media attribute in an illustrative embodiment.
Figure 10:
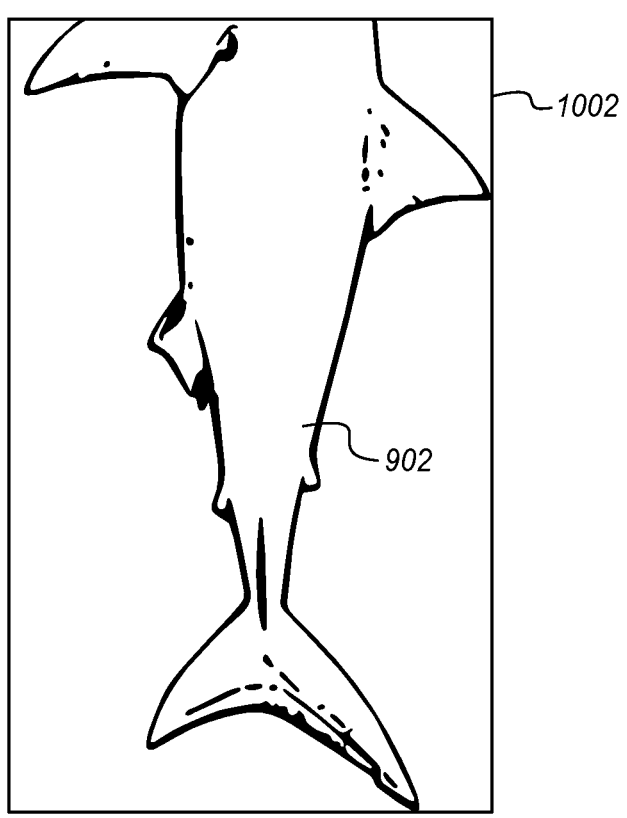
FIG. 10 illustrates a printed output of the logical page of FIG. 9 resulting in an undesirable output in an illustrative embodiment.

If the page being processed does have an unmodifiable media attribute and has a media exception, then processor 106 assigns the page to one of RIPs 104 (e.g., RIP 104-1) for rasterization based on the unmodifiable media attribute (see FIG. 2, step 220). FIG. 9 illustrates logical page 114-1 having an unmodifiable media attribute in an illustrative embodiment. In one non-limiting example, if logical page 114-1 (or print job 110) specifies a portrait orientation of an image 902 on A4 long-edge fed media (e.g., an orientation of edge 904 of logical page 114-1 with respect to a transport direction indicated by arrow 906), and job ticket 118 specifies the use of A4 short-edge fed media for logical page 114-1 (e.g., an orientation of edge 908 of logical page 114-1 with respect to a transport direction indicated by arrow 906), then a conflict between logical page 114-1 and job ticket 118 exists. Typically, the conflict is resolved in favor of the instructions in job ticket 118 for POSTSCRIPT® jobs by submitting a custom CTM to the POSTSCRIPT® interpreter to rotate the portrait image during rasterization. However as described above, the custom CTM (e.g., a CTM that differs from the job-specified CTM) may be overwritten by the job-specified CTM by the POSTSCRIPT® interpreter when POSTSCRIPT® procedures are present in print job 110 or the page that prevent the custom CTM modifications used to correct the conflict in favor of the instructions in job ticket 118, which may result in undesired media attributes in a printed output of logical page 114-1. FIG. 10 illustrates a printed output 1002 of logical page 114-1 resulting in the undesirable output in an illustrative embodiment. In this embodiment, a portion of image 902 is cut off.

Figure 11:
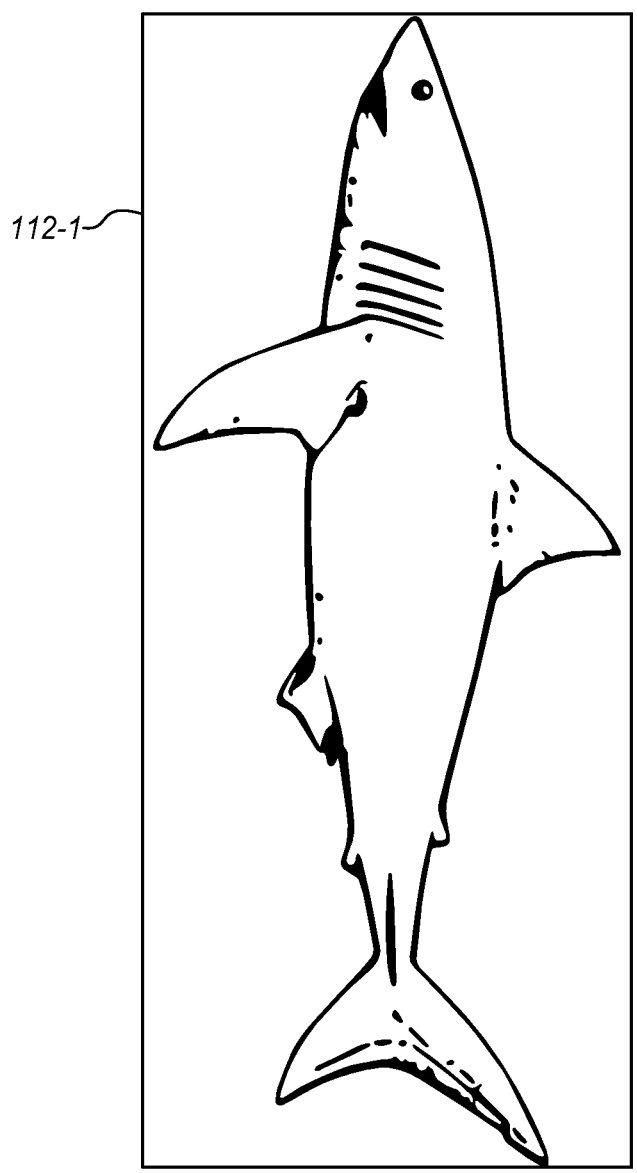
FIG. 11 illustrates a result of generating raster data for the logical page of FIG. 9 based on the unmodifiable media attribute in an illustrative embodiment.

In continuing with the example, to prevent the undesirable output of logical page 114-1 upon printing logical page 114-1, processor 106 assigns logical page 114-1 to one of RIPs 104 (e.g., RIP 104-1) for rasterization based on the unmodifiable media attribute. RIP 104-1 generates raster data 112-1, which in this case, is based on the unmodifiable media attribute specified for the logical page 114-1 rather than the media attribute specified by job ticket 118 for logical page 114-1. FIG. 11 illustrates the result of generating raster data 112-1 for logical page 114-1 based on the unmodifiable media attribute of logical page 114-1 in an illustrative embodiment.

Figure 12:
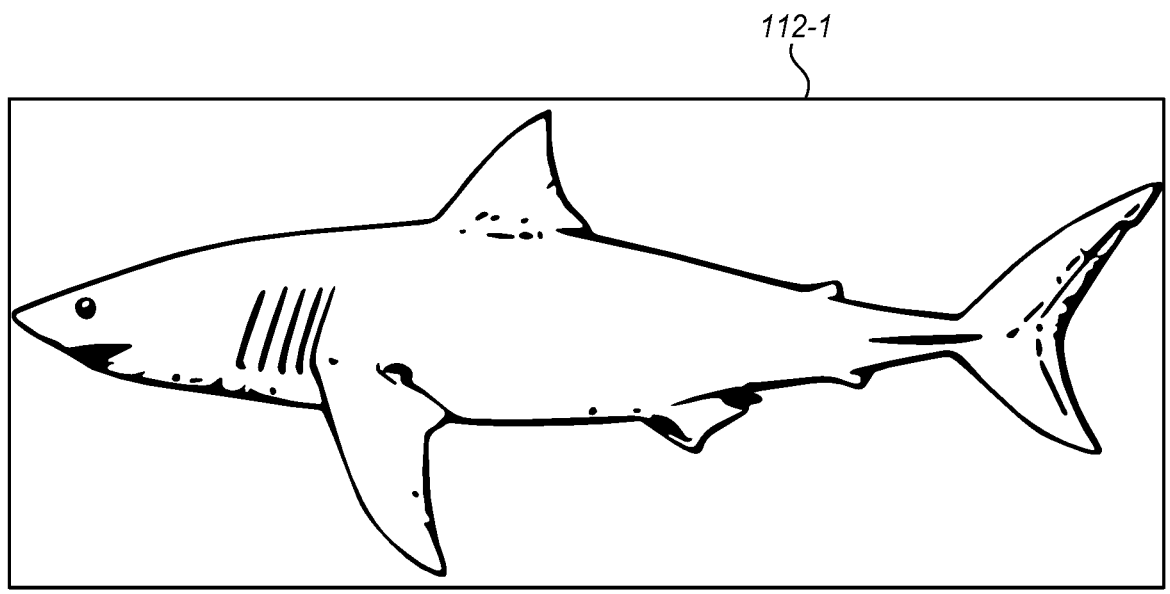
FIG. 12 illustrates the result of rotating the raster data of FIG. 11 in an illustrative embodiment.

Processor 106 modifies raster data 112 for the page based on the media attribute specified for the page in job ticket 118 (see FIG. 2, step 222). Processor 106 may scale, rotate, and/or translate raster data 112 based on a difference between the scaling, rotation, and/or translation specified by the unmodifiable media attribute for the page and the scaling, rotation, and/or translation specified by the media attribute of job ticket 118 for the page. In continuing with the example regarding logical page 114-1 illustrated in FIG. 9, processor 106 modifies raster data 112-1 generated by RIP 104-1 to rotate raster data 112-1. FIG. 12 illustrates the result of rotating raster data 112-1 for logical page 114-1 in an illustrative embodiment. In continuing with the example, job ticket 118 specified the use of A4 short-edge fed media for logical page 114-1, and rotating raster data 112-1 after rasterization resolves the conflict between job ticket 118 and logical page 114-1 and ensures that the undesirable output illustrated in FIG. 10 is prevented.

Referring again to FIG. 2, processor 106 determines whether logical pages 114 remain for processing (see step 224). If logical pages 114 remain for processing, then processor 106 selects another page (see step 226), and processing returns to step 210 to analyze another page. If no logical pages 114 remain for processing, then processor 106 assembles raster data 112 into sheetside images 122 (see FIG. 3, step 228). Processor 106 may transmit sheetside images 122 to a destination (see FIG. 3, step 230). Print engine 124 may receive sheetside images 122 (see FIG. 3, step 232), and may mark one or more of colorants 126 to medium 120 based on sheetside images 122 to generate a printed output of print job 110 (see FIG. 3, step 234).

Figure 3:
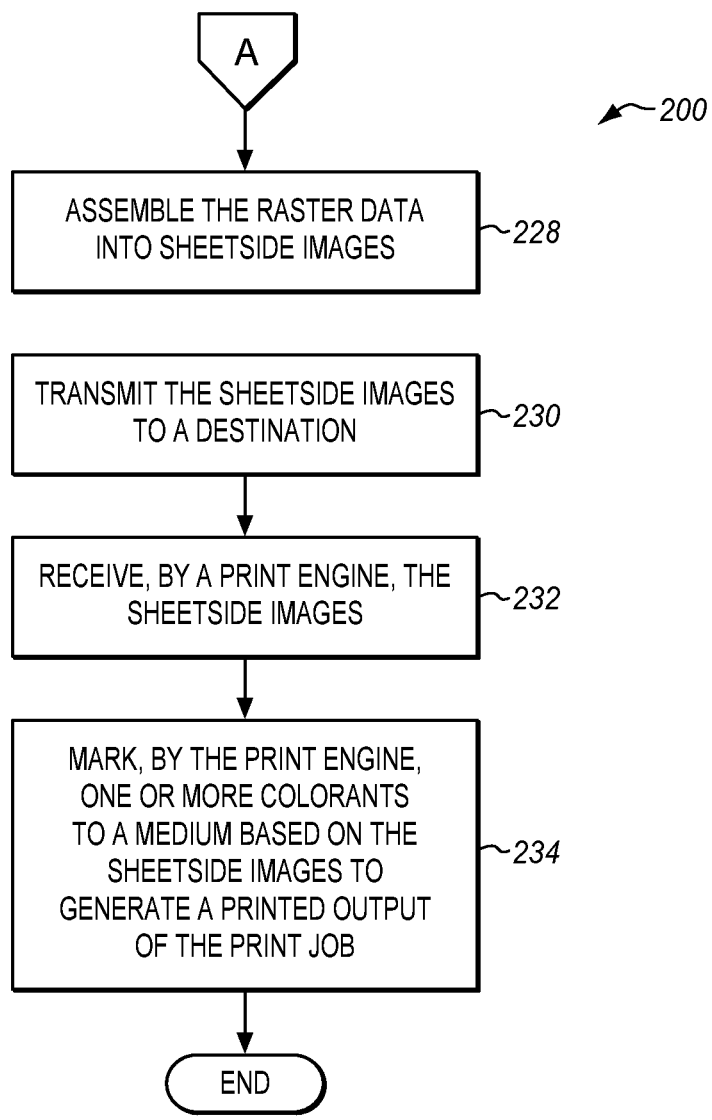
Figure 4:
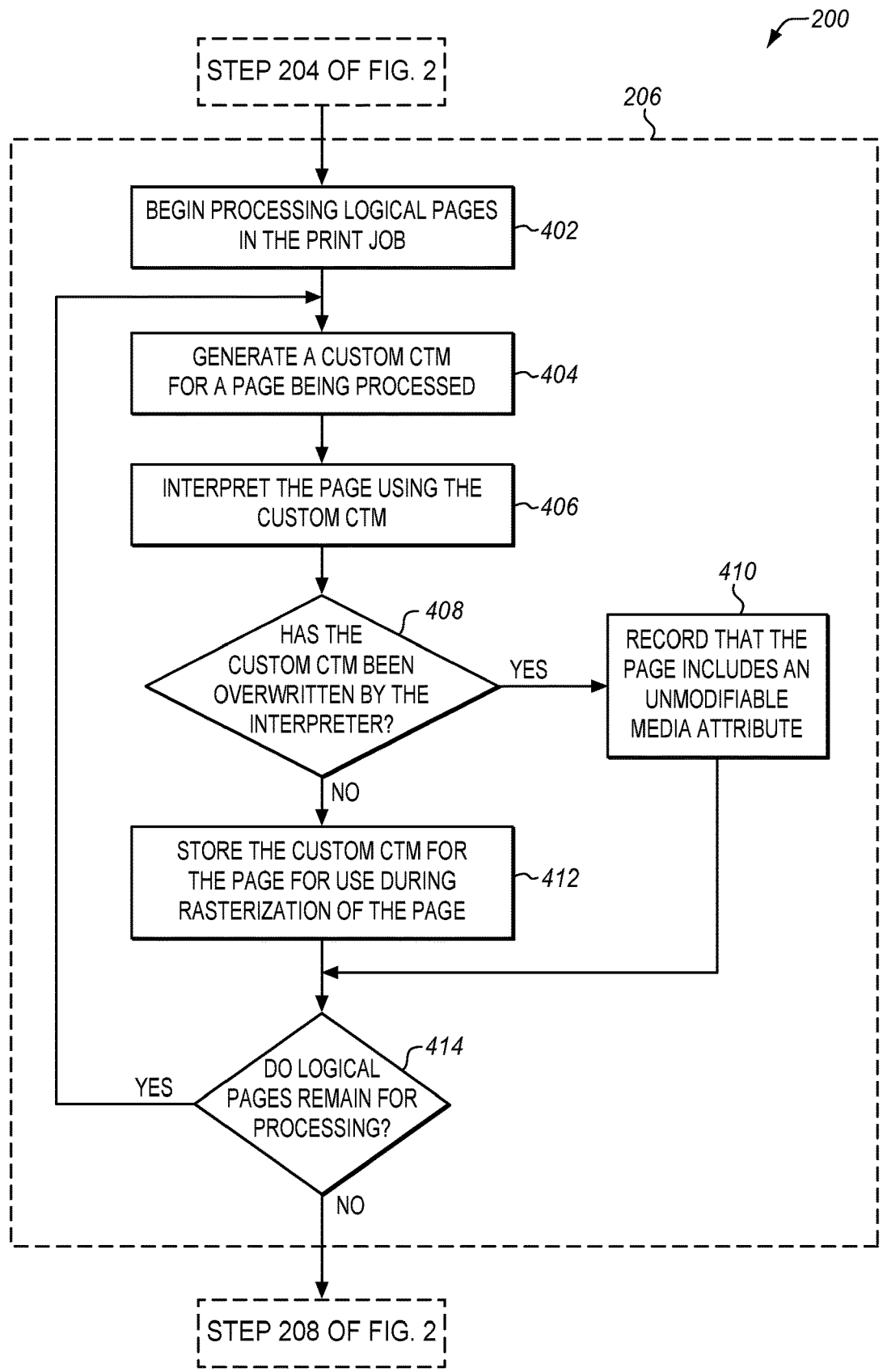
FIG. 4 is a flow chart depicting additional details of the method of FIGS. 2-3 in an illustrative embodiment.

FIG. 4 is a flow chart depicting additional details of method 200 of FIGS. 2-3 in an illustrative embodiment. In particular, FIG. 4 depicts processing which may occur during step 206 of method 200 to identify logical pages 114 of print job 110 that have unmodifiable media attributes.

Processor 106 begins its processing of logical pages 114 in print job 110 to identify which of logical pages 114 have unmodifiable media attributes (see FIG. 4, step 402). For instance, processing print job 110 may be performed during a pre-flight process. Processor 106 generates a custom CTM for the page being processed (see step 404). For example, processor 106 may analyze the PDL for the page being processed to identify CTM related POSTSCRIPT® operators, determine whether the CTM related POSTSCRIPT® operators are subject to CTM modifications based on the media attribute specified in job ticket 118 for the page, and generate the custom CTM for the page based on the media attribute.

Processor 106 submits the page being processed for interpretation using the custom CTM (see FIG. 4, step 406). For instance, processor 106 may submit the custom CTM to RIP 104-1, and direct RIP 104-1 to interpret the page being processed using the custom CTM. Processor 106 determines whether the custom CTM has been overwritten by the interpreter (see FIG. 4, step 408). For example, processor 106 may query RIP 104-1, responsive to interpreting the page, for the current CTM in use by RIP 104-1. Processor 106 may compare the current CTM in use by RIP 104-1 with the custom CTM. If the page being processed has an unmodifiable media attribute, then the custom CTM may be overwritten during interpretation by RIP 104-1 with the job-specified CTM (e.g., RIP 104-1 encounters the unmodifiable media attribute during interpretation, and overwrites the custom CTM supplied by processor 106 with the job-specified CTM).

If the custom CTM has been overwritten, then processor 106 records that the page being processed has unmodifiable media attribute (see FIG. 4, step 410). This information may be used during step 214 of method 200 (see FIG. 2). If the custom CTM has not been overwritten by the interpreter (e.g., the CTM in use by RIP 104-1 after interpreting the page is the same as the custom CTM), then processor 106 may store the custom CTM for the page being processed for use during rasterization of the page (see FIG. 4, step 412). This custom CTM for the page being processed may be used during step 216 of method 200 (see FIG. 2).

Processor 106 determines whether logical pages 114 in print job 110 remain for processing (see step 414). If no pages remain for processing, then step 208 of method 200 is performed (see FIG. 2). However, if pages remain for processing, then execution returns to step 404 and another page is processed to determine if the page includes an unmodifiable media attribute. Processing continues until no pages remain for processing.

Figure 5:
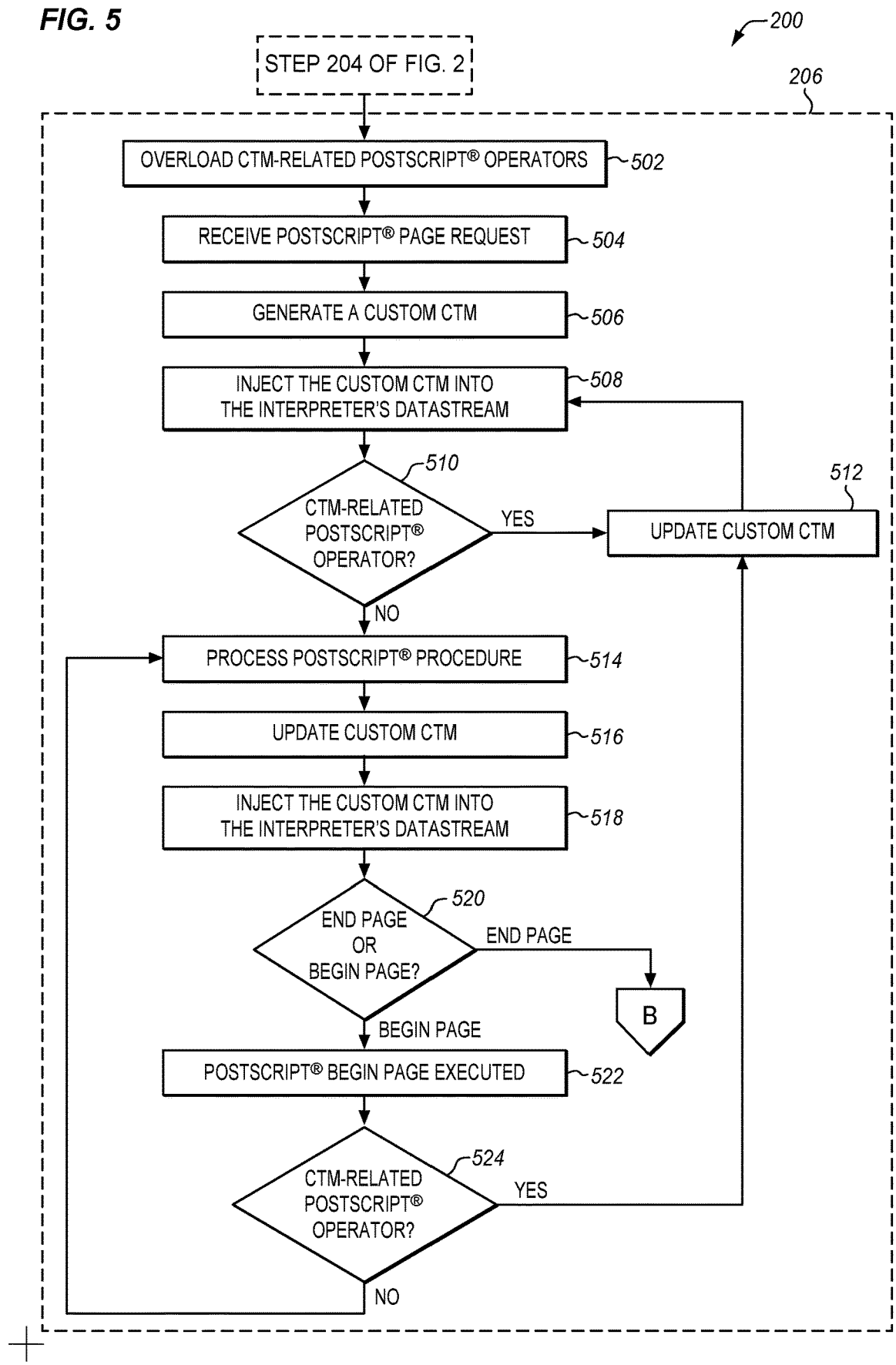
FIGS. 5-6 are flow charts depicting additional details of the method of FIGS. 2-3 in another illustrative embodiment.
Figure 6:
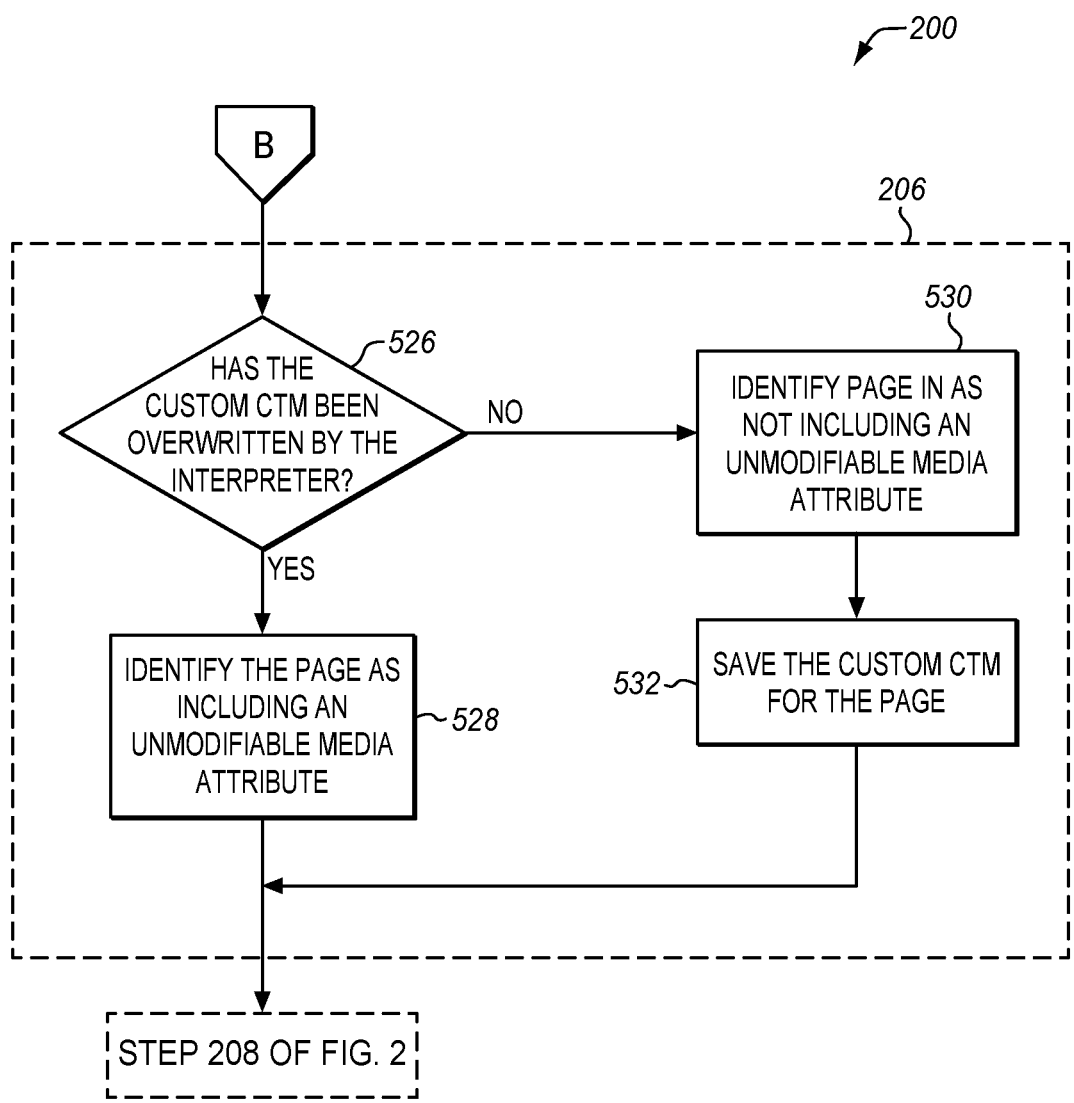

FIGS. 5-6 are flow charts depicting additional details of method 200 of FIGS. 2-3 in another illustrative embodiment. In particular, FIGS. 5-6 depict processing which may occur during step 206 of method 200 (see FIG. 3) to identify logical pages 114 of print job 110 that include unmodifiable media attributes.

In response to processing step 204 of FIG. 2, previously described, Processor 106 overloads CTM-related POSTSCRIPT® operators (see FIG. 5, step 502). Overloading POSTSCRIPT® operators (e.g. translate, rotate, scale) involves creating custom procedures in the highest-level dictionary that are called by the POSTSCRIPT® interpreter when it encounters the same-named POSTSCRIPT® operator on a given POSTSCRIPT® page. The custom procedure can examine the current page device (page state), collect data and then must call the same-named operator in the next-highest dictionary (chaining) for proper operator processing. Overloaded procedures are injected into the POSTSCRIPT® interpreter's data stream during startup processing, as well as before print job 110 data is processed.

Processor 106 receives a POSTSCRIPT® page request (see FIG. 5, step 504). For example, from processor 106. Processor 106 generates a custom CTM for a page (see FIG. 5, step 506). A custom CTM may first be built from the page's job ticket 118 media and layout attributes during Preflight. This may involve injecting translate, rotate and/or scaling POSTSCRIPT® operators containing the representative values found in job ticket 118 attributes into the interpreter's data stream. The custom CTM may then be modified (e.g., using the same translate, rotate, and/or scale operator injections as the relevant POSTSCRIPT® operators are encountered for the page). These are not the only CTM-altering operators, just a commonly-used set.

Processor 106 injects the custom CTM into the interpreter's data stream (see FIG. 5, step 508). For instance, processor 106 may inject the custom CTM into the PDL datastream of RIP 104-1 prior to submitting a page to RIP 104-1 for interpretation.

Processor 106 analyzes the PDL datastream for the page that is being submitted (as per the example) to RIP 104-1 for interpretation during processing of the page, and determines whether a CTM-related POSTSCRIPT® operator has been encountered (see FIG. 5, step 510). If a CTM-related POSTSCRIPT® operator has been encountered in the PDL datastream, then processor 106 updates the custom CTM (see FIG. 5, step 512), and processing returns to step 508.

If no CTM-related POSTSCRIPT® operator is encountered in the PDL datastream, then processor 106 processes the POSTSCRIPT® procedure (see FIG. 5, step 514). Processor 106 updates the custom CTM (see FIG. 5, step 516) and injects the custom CTM into the interpreters datastream (see FIG. 5, step 518).

Processor 106 checks whether an end page or a begin page procedure has been encountered (see step 520). If a begin page procedure has been encountered in the PDL datastream, then processor 106 executes a POSTSCRIPT® begin page procedure (see FIG. 5, step 522).

Processor 106 analyzes the PDL datastream for the page that is being submitted (as per the example) to RIP 104-1 for interpretation during processing of the page, and determines whether a CTM-related POSTSCRIPT® operator has been encountered (see FIG. 5, step 524). If a CTM-related POSTSCRIPT® operator is encountered in the PDL datastream, then processor 106 updates the custom CTM (see FIG. 5, step 512), and processing returns to step 508. If no CTM-related POSTSCRIPT® operator is encountered in the PDL datastream, then processor 106 returns processing to step 514 to process the POSTSCRIPT® procedure.

Returning to step 520, if an end page POSTSCRIPT® procedure is encountered, then processor 106 determines whether the custom CTM has been overwritten by the interpreter (see FIG. 6, step 526). For instance, if RIP 104-1 processes an unmodifiable media attribute in the page during interpretation, RIP 104-1 may overwrite the custom CTM with the job-specified CTM. Thus, step 526 checks whether the custom CTM has been overwritten. If the custom CTM has been overwritten, then processor 106 identifies that the page being processed has an unmodifiable media attribute (see FIG. 6, step 528). This information may be used during processing of step 214 of method 200. Processing continues to step 208 of FIG. 2, previously described.

If processor 106 determines that the custom CTM has not been overwritten by the interpreter, then processor 106 identifies the page as not including an unmodifiable media attribute (see FIG. 6, step 530). Processor 106 saves the custom CTM for the page (see FIG. 6, step 532). This custom CTM may be used, for example, when step 216 of method 200 is executed (see FIG. 2), which describes that a custom CTM may be submitted to a RIP 104 (e.g., RIP 104-1) prior to assigning the page to RIP 104-1 for rasterization. Processing continues to step 208 of FIG. 2, previously described.

Post-RIP processing of raster data 112 generated for pages that include unmodifiable media attributes ensures that the pages are printed correctly when generating a printed output. This ensures that the subset of print jobs 110 that include such features are processed correctly, thereby improving the printing process.

Figure 7:
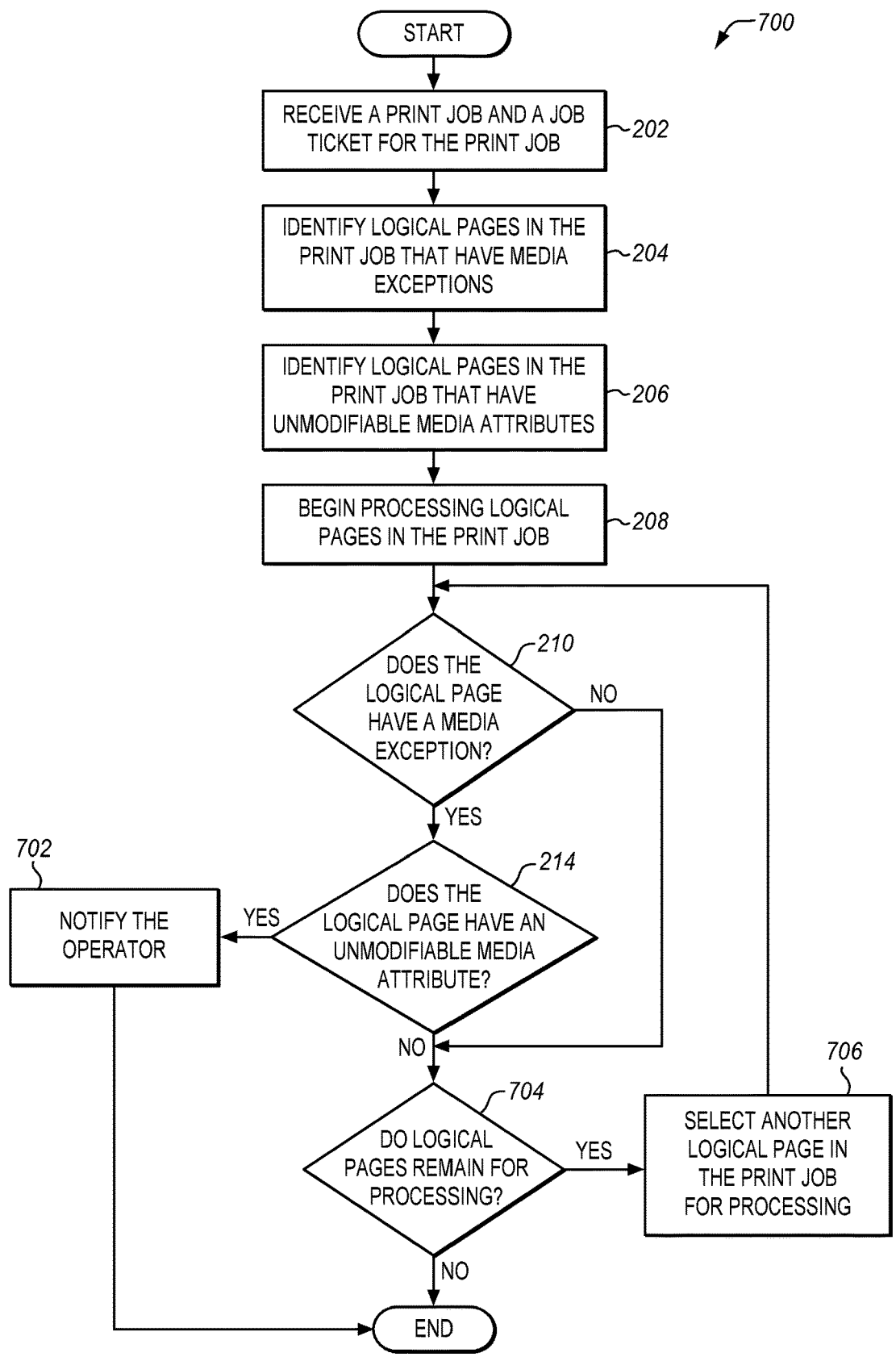
FIG. 7 is a flow chart of a method of providing a notification to an operator during a pre-flight media exception check of a print job in an illustrative embodiment.

FIG. 7 is a flow chart of a method 700 of providing a notification to an operator during a pre-flight media exception check of a print job in an illustrative embodiment. Method 700 will be discussed with respect to print controller 101, although method 700 may be performed by other systems, not shown.

Processor 106 receives print job 110 and job ticket 118 for print job (see FIG. 7, step 202, previously described). Processor 106 identifies logical pages 114 in print job 110 that have media exceptions (see FIG. 7, step 204, previously described), identifies logical pages 114 in print job 110 that have unmodifiable media attributes (see FIG. 7, step 206, previously described), and begins processing logical pages 114 in print job 110 (see FIG. 7, step 208, previously described).

Processor 106 determines whether the page being processed has a media exception (see FIG. 7, step 210, previously described). If processor 106 determines that the page being processed has a media exception, then processor 106 determines whether the page being processed has an unmodifiable media attribute (see FIG. 7, step 214, previously described). If the page being processed does not have an unmodifiable media attribute, then step 704 is performed.

If the page being processed has an unmodifiable media attribute and the page being processed has a media exception, then an operator is notified (see FIG. 7, step 702). For instance, processor 106 of controller 102, to provide the notification, may transmit a signal to user interface 116 (see FIG. 1) that generates a visual indication at user interface 116 to the operator. Notifying the operator that these two conditions are present in print job 110 (i.e., that a logical page 114 has an unmodifiable media attribute in combination with a media exception) allows the operator the opportunity to address the issue. For instance, the operator may elect to insert different media (e.g., load A4 media specified by the unmodifiable media attribute of the page of print job 110 rather than load letter media specified in job ticket 118 for print job 110) to correct the issue. In another example, the operator may elect to change the feed orientation of the media (e.g., load A4 short-edge fed media as specified by the unmodifiable media attribute of the page of print job 110 rather than load A4 long-edge fed media as specified in job ticket 118 for print job 110) to correct the issue. In another example, the operator may elect to modify raster data 112 generated for logical pages 114 in print job 110 that have an unmodifiable media attribute and a media exception, as previously described with respect to method 200.

Returning to step 210 of FIG. 7, if the page does not have a media exception, then processor 106 determines whether pages remain for processing (see FIG. 7, step 704). If pages remain for processing, then processor 106 selects another page for processing from print job 110 (see FIG. 7, step 706), and processing returns to step 210 in FIG. 7 to perform the analysis on another page in print job 110. If no pages remain for processing, then method 700 ends.

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Figure 8:
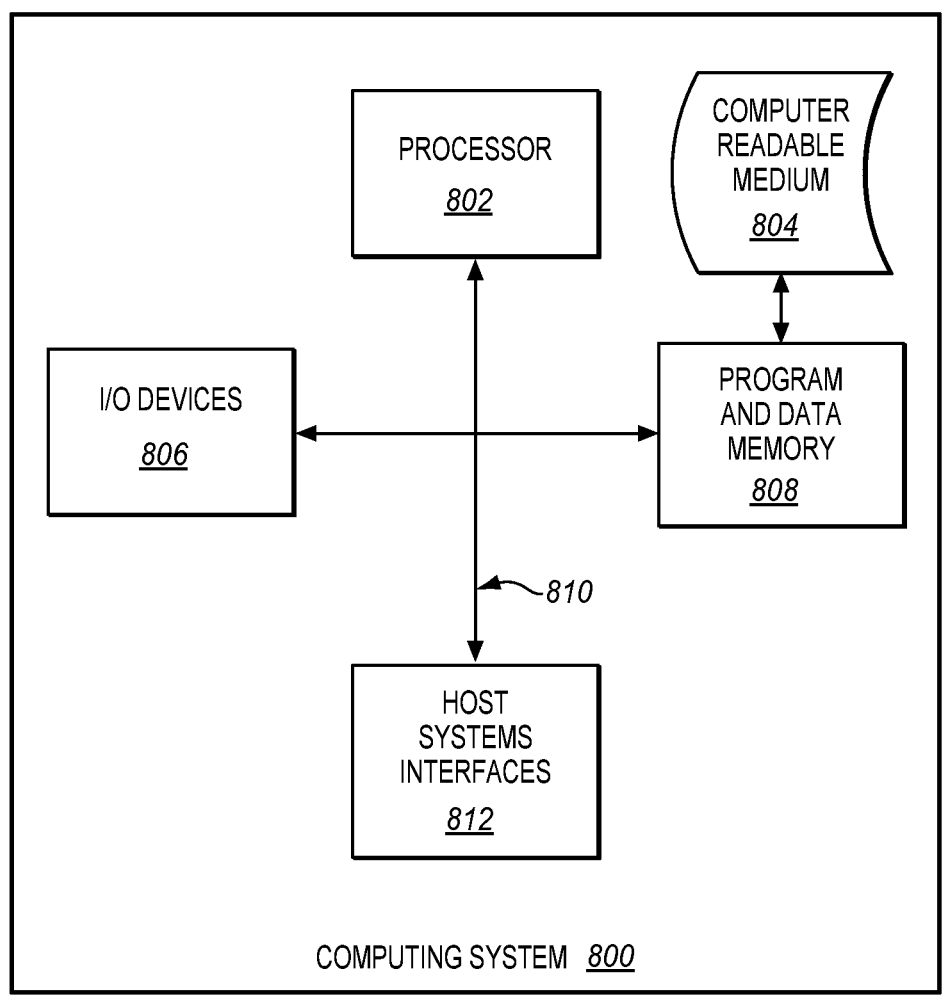
FIG. 8 is a block diagram of a computing system in which a computer readable medium may provide instructions for performing any of the functionality disclosed herein.

In one embodiment, the invention is implemented in software, which includes but is not limited to firmware, resident software, microcode, etc. FIG. 8 illustrates a computing system 800 in which a computer readable medium 804 may provide instructions for performing any of the functionality disclosed.

Furthermore, the invention can take the form of a computer program product accessible from computer readable medium 804 that provides program code for use by or in connection with a processor or any instruction execution system. For the purposes of this description, computer readable medium 804 can be any apparatus that can tangibly store the program for use by or in connection with the instruction execution system, apparatus, or device, including computing system 800.

Computer readable medium 804 can be any tangible electronic, magnetic, optical, electromagnetic, infrared, or semiconductor system (or apparatus or device). Examples of computer readable medium 804 include a semiconductor or solid-state memory, magnetic tape, a removable computer diskette, a random-access memory (RAM), a read-only memory (ROM), a rigid magnetic disk and an optical disk. Some examples of optical disks include compact disk-read only memory (CD-ROM), compact disk-read/write (CD-R/W) and DVD.

Computing system 800, suitable for storing and/or executing program code, can include one or more processors 802 coupled directly or indirectly to memory 808 through a system bus 810. Memory 808 may include local memory employed during actual execution of the program code, bulk storage, and cache memories which provide temporary storage of at least some program code in order to reduce the number of times code is retrieved from bulk storage during execution. Input/output (IO) devices 806 (including but not limited to keyboards, displays, pointing devices, etc.) can be coupled to the system either directly or through intervening IO controllers. Network adapters may also be coupled to the system to enable computing system 800 to become coupled to other data processing systems, such as through host systems interfaces 812, or remote printers or storage devices through intervening private or public networks. Modems, cable modem and Ethernet cards are just a few of the currently available types of network adapters.

Although specific embodiments were described herein, the scope is not limited to those specific embodiments. Rather, the scope is defined by the following claims and any equivalents thereof.

What is claimed is:

1. A system, comprising:
a print controller, comprising:
   a Raster Image Processor (RIP); and
   a controller configured to identify a logical page comprising a Page Description Language (PDL) and having an unmodifiable media attribute, wherein the unmodifiable media attribute for the logical page prevents a modification of a presentation of the logical page prior to rasterizing the logical page,
   the controller is configured to process a job ticket to determine that the logical page has a media exception, wherein the media exception comprises a conflict between the unmodifiable media attribute for the logical page and a media attribute specified in the job ticket for the logical page,
   the controller is configured, responsive to the logical page having the media exception and the unmodifiable media attribute, to direct the RIP to rasterize the logical page based on the unmodifiable media attribute by interpreting the PDL, and to modify raster data generated by the RIP for the logical page based on the media attribute specified in a job ticket for the logical page to resolve the media exception for the logical page.

2. The system of claim 1, wherein:
the system further includes a user interface,
the controller is configured to notify an operator using the user interface in response the logical page having the media exception and the unmodifiable media attribute.

3. The system of claim 1, wherein:
the controller is configured to direct the RIP to interpret the PDL of the logical page based on an operating parameter of the RIP, to determine that the operating parameter has been modified in response to interpreting the PDL of logical page, and to determine that the logical page has the unmodifiable media attribute in response to determining that the operating parameter has been modified.

4. The system of claim 3, wherein:
the PDL of the logical page comprises PostScript,
the operating parameter comprises a Current Transformation Matrix (CTM) for the RIP.

5. The system of claim 4, wherein:
the controller, to determine that the logical page has the unmodifiable media attribute, is configured to:
   generate a custom CTM for the logical page based on a difference between the unmodifiable media attribute and the media attribute specified in the job ticket for the logical page;
   direct the RIP to interpret the PDL of logical page using the custom CTM;
   determine that the RIP has overwritten the custom CTM during interpretation of the PDL of the logical page; and
   determining the logical page has the unmodifiable media attribute in response to the custom CTM being overwritten.

6. The system of claim 1, wherein:
the controller is configured to transmit the modified raster data to a destination,
the system further comprises:
   at least one print engine configured to receive the modified raster data, and to mark at least one colorant onto a medium based on the modified raster data to generate at least a portion of a printed output for the print job.

7. The system of claim 1, wherein:
the PDL of the logical page comprises PostScript,
the unmodifiable media attribute comprises at least one PostScript layout instruction and at least one PostScript procedure that enforces a Current Transformation Matrix (CTM) specified for the logical page.

8. The system of claim 1, wherein:
the unmodifiable media attribute maps coordinates specified by the PDL into output device coordinates to implement at least one of scaling, rotation, and translation of a print image.

9. The system of claim 1, wherein:
the controller is configured, responsive to the logical page having the media exception and not having the unmodifiable media attribute, to modify the presentation of the logical page based on the media attribute in the job ticket prior to rasterizing the logical page, and to direct the RIP to rasterize the logical page with the modified presentation by interpreting the PDL.

10. A method, comprising:
identifying a logical page of a print job comprising a Page Description Language (PDL) and having an unmodifiable media attribute, wherein the unmodifiable media attribute for the logical page prevents a modification of a presentation of the logical page prior to rasterizing the logical page;
processing a job ticket to determine that the logical page has a media exception, wherein the media exception comprises a conflict between the unmodifiable media attribute for the logical page and a media attribute specified in the job ticket for the logical page;
rasterizing, responsive to the logical page having the media exception and the unmodifiable media attribute, the logical page based on the unmodifiable media attribute by interpreting the PDL; and
modifying raster data generated for the logical page based on a media attribute specified in a job ticket for the logical page to resolve the media exception for the logical page.

11. The method of claim 10, further comprising:
notifying an operator in response to the logical page having the media exception and the unmodifiable media attribute.

12. The method of claim 10, further comprising:
interpreting, by a Raster Image Processor (RIP), the PDL of the logical page based on an operating parameter of the RIP;
determining that the operating parameter has been modified in response to interpreting the PDL of the logical page; and
determining that the logical page has the unmodifiable media attribute in response to the operating parameter being been modified.

13. The method of claim 12, wherein:
the PDL of the print job comprises PostScript,
the operating parameter comprises a Current Transformation Matrix (CTM) for the RIP.

14. The method of claim 13, wherein:
determining that the logical page has the unmodifiable media attribute further comprises:
generating a custom CTM for the logical page based on a difference between the unmodifiable media attribute and the media attribute specified in the job ticket for the logical page;
directing the RIP to interpret the PDL of logical page using the custom CTM;
determining that the RIP has overwritten the custom CTM during interpretation of the PDL of logical page; and
determining the logical page includes the unmodifiable media attribute in response to the custom CTM being overwritten.

15. The method of claim 10, wherein:
the unmodifiable media attribute maps coordinates specified by the PDL into output device coordinates to implement at least one of scaling, rotation, and translation of a print image.

16. The method of claim 10, further comprising:
modifying, responsive to the logical page having the media exception and not having the unmodifiable media attribute, the presentation of the logical page based on the media attribute in the job ticket prior to rasterizing the logical page; and
rasterizing, in response to modifying the presentation, the logical page with the modified presentation by interpreting the PDL.

17. A non-transitory computer readable medium embodying programmed instructions which, when executed by at least one processor, direct the at least one processor to:
identify a logical page of a print job comprising a Page Description Language and having an unmodifiable media attribute, wherein the unmodifiable media attribute for the logical page prevents a modification of a presentation of the logical page prior to rasterizing the logical page;
process a job ticket to determine that the logical page has a media exception, wherein the media exception comprises a conflict between the unmodifiable media attribute for the logical page and a media attribute specified in the job ticket for the logical page;
rasterize, responsive to the logical page having the media exception and the unmodifiable media attribute, the logical page based on the unmodifiable media attribute by interpreting the PDL; and
modify raster data generated for the logical page based on a media attribute specified in a job ticket for the logical page to resolve the media exception for the logical page.

18. The non-transitory computer readable medium of claim 17, wherein the programmed instructions direct the at least one processor to:
notify an operator in response to the logical page having the media exception and the unmodifiable media attribute.

19. The non-transitory computer readable medium of claim 17, wherein the programmed instructions direct the at least one processor to:
interpret, by a Raster Image Processor (RIP), the PDL of the logical page based on an operating parameter of the RIP;
determine that the operating parameter has been modified in response to interpreting the PDL of the logical page; and
determine that the logical page has the unmodifiable media attribute in response to the operating parameter being modified.

20. The non-transitory computer readable medium of claim 19, wherein:
the PDL of the print job comprises PostScript,
the operating parameter comprises a Current Transformation Matrix (CTM) for the RIP.

21. The non-transitory computer readable medium of claim 20, wherein the programmed instructions directing the at least one processor to determine that the logical page has the unmodifiable media attribute further comprise instructions to:
generate a custom CTM for the logical page based on a difference between the unmodifiable media attribute and the media attribute specified in the job ticket for the logical page;
direct the RIP to interpret the PDL of logical page using the custom CTM;
determine that the RIP has overwritten the custom CTM during interpretation of the PDL of logical page; and
determine the logical page includes the unmodifiable media attribute in response to the custom CTM being overwritten.

22. The non-transitory computer readable medium of claim 17, wherein:
the unmodifiable media attribute maps coordinates specified by the PDL into output device coordinates to implement at least one of scaling, rotation, and translation of a print image.

23. The non-transitory computer readable medium of claim 17, wherein the programmed instructions direct the at least one processor to: modifying, responsive to the logical page having the media exception and not having the unmodifiable media attribute, the presentation of the logical page based on the media attribute in the job ticket prior to rasterizing the logical page; and rasterizing, in response to modifying the presentation, the logical page with the modified presentation by interpreting the PDL.

* * * * *